United States Patent
Thompson

(10) Patent No.: US 12,197,518 B2
(45) Date of Patent: Jan. 14, 2025

(54) INTELLIGENT PROMPT GENERATION

(71) Applicant: INTEGRATION APPLIANCE, INC., Palo Alto, CA (US)

(72) Inventor: Angus John Thompson, Honolulu, HI (US)

(*) Notice: Subject to any disclaimer, the term of this patent is extended or adjusted under 35 U.S.C. 154(b) by 0 days.

(21) Appl. No.: 18/140,484

(22) Filed: Apr. 27, 2023

(65) Prior Publication Data

US 2024/0362280 A1    Oct. 31, 2024

(51) Int. Cl.
| | |
|---|---|
| G06F 7/02 | (2006.01) |
| G06F 16/00 | (2019.01) |
| G06F 16/2457 | (2019.01) |
| G06F 16/9535 | (2019.01) |
| G06F 16/9538 | (2019.01) |

(52) U.S. Cl.
CPC .... *G06F 16/9535* (2019.01); *G06F 16/24578* (2019.01); *G06F 16/9538* (2019.01)

(58) Field of Classification Search
CPC .......... G06F 16/9535; G06F 16/24578; G06F 16/9538
See application file for complete search history.

(56) References Cited

U.S. PATENT DOCUMENTS

| | | | |
|---|---|---|---|
| 9,953,060 B2 | 4/2018 | Cherukuri | |
| 10,620,801 B1* | 4/2020 | Fein | G06F 3/04842 |
| 11,564,571 B2 | 1/2023 | Karsten et al. | |
| 11,630,870 B2 | 4/2023 | Abdunabi | |
| 2004/0139396 A1* | 7/2004 | Gelernter | G06F 16/30 715/255 |
| 2022/0138697 A1 | 5/2022 | Neckermann et al. | |
| 2022/0182699 A1* | 6/2022 | Gordon | H04N 21/251 |
| 2022/0365993 A1* | 11/2022 | Voisin | G06F 40/30 |

FOREIGN PATENT DOCUMENTS

CN    114329141 A    4/2022

OTHER PUBLICATIONS

International Search Report and Written Opinion of the International Searching Authority directed to related International Patent Application No. PCT/US2024/025927, mailed Aug. 9, 2024; 9 pages.

* cited by examiner

*Primary Examiner* — Bruce M Moser

(57) ABSTRACT

Disclosed herein are system, method, and computer program product embodiments for generating intelligent prompts. An embodiment operates by identifying a plurality of content elements in a content object retrieved from a third-party system. The embodiment receives supplemental data collected by one or more enricher micro services invoked based on the plurality of content elements in the content object. The embodiment identifies one or more topics in the content object. The embodiment further creates a nudge card for the content object that includes the plurality of content elements, the supplemental data, the one or more topics, an expiration timer, and at least one interface element associate with an action. The embodiment transmits the nudge card for the content object within a nudge card feed to a client device for presentation to a user.

17 Claims, 7 Drawing Sheets

INTELLIGENT PROMPT GENERATION

BACKGROUND

Due to the number of decisions and the abundance of disconnected data, many professionals, including c-suite executives, law firm partners, and management consultants, often need help making the best business decisions. Instead of making well-informed decisions, professionals often resort to guestimates or pursue easy options. Failure to make well-informed decisions or take "hard-to-do" actions may prevent professionals from driving higher returns for their businesses. However, currently available productivity tools cannot provide timely and valuable insights with a notification about an upcoming task or decision. Accordingly, what is needed is an improved mechanisms for generating intelligent prompts for upcoming tasks and decisions that enable better decision-making and make necessary actions easier to do.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for generating intelligent prompts.

In some embodiments, this disclosure provides unique solutions to the above technical problems of current web technologies. For example, the disclosed system provides several technical implementations which include at least, but not limited to: 1) continuously crawling various third-party sources to obtain data regarding upcoming decisions and tasks; 2) generating intelligent prompts that include contextual options based on data collected from third-party sources to enable earlier actions and collaboration with others; and 3) utilizing behavioral science and machine learning to deliver the intelligent prompts in a personally engaging user interface.

Figure 1:
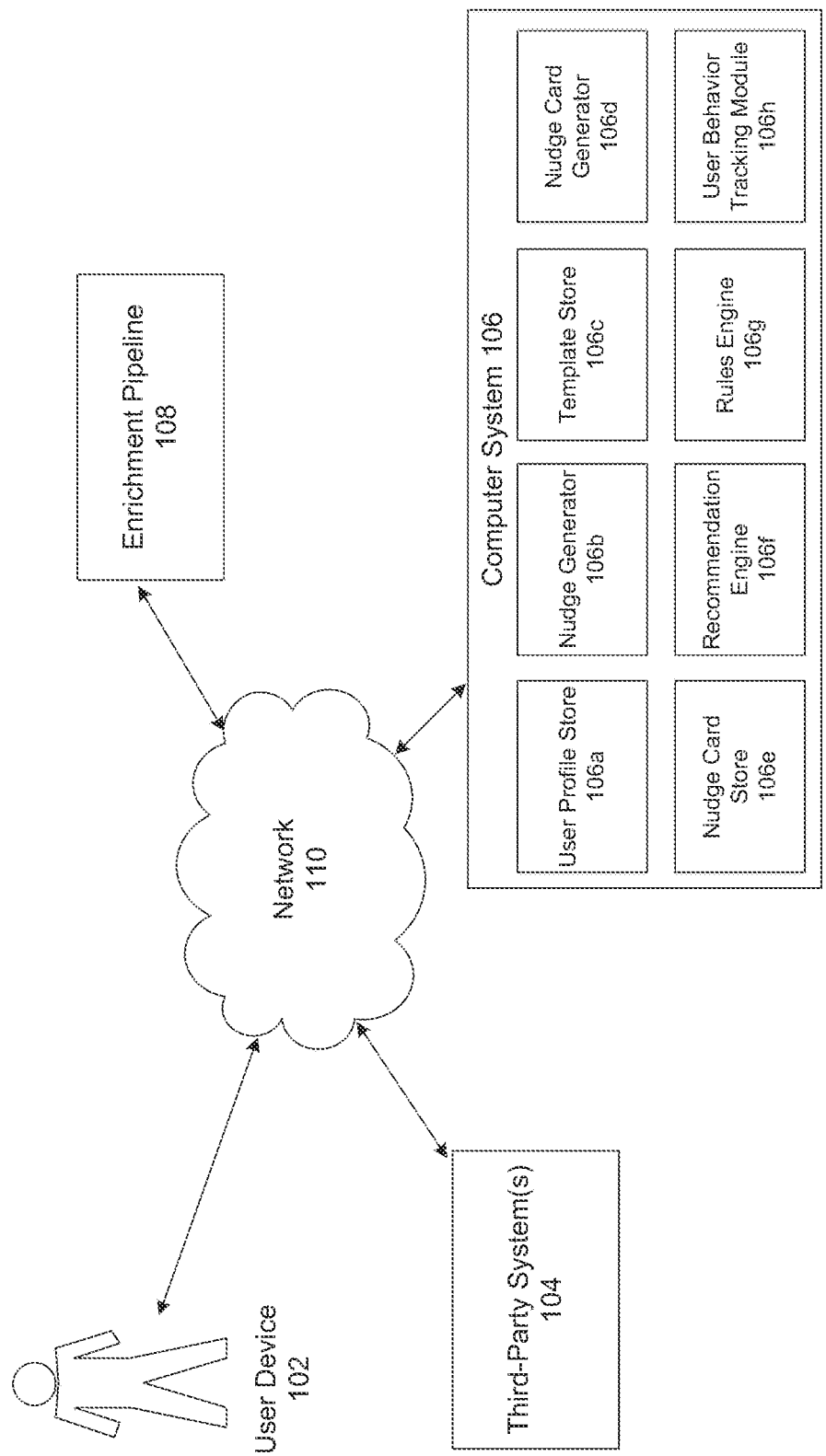
FIG. 1 is a block diagram of an exemplary system for generating intelligent prompts, in accordance with aspects of the disclosure.

FIG. 1 illustrates a block diagram of an exemplary system environment 100 for generating intelligent prompts, in accordance with some aspects of the disclosure. In the embodiment shown in FIG. 1, the system environment 100 may comprise one or more one or more user devices 102, one or more third-party systems 104, a computer system 106, and an enrichment pipeline 108, and a network 110. In some aspects, the system environment 100 may include additional or different components.

The one or more user devices 102 may include devices that are capable of executing various software applications. The one or more user devices 102 may include a central processing unit (CPU), a memory, a network interface, and a display. The one or more user devices 102 may include various modules, which can be implemented as hardware, software, or a combination of hardware and software, such as mobile applications. Examples of the one or more user devices 102 may include cellular telephones, smartphones, personal digital assistants (PDAs), tablet computers, laptop computers, desktop computers, Internet-of-Things (IoT) devices, or the like.

The one or more third-party systems 104 may be systems external to computer system 106 that generate and/or provide content objects for presentation to a user via an application executing on the user device 102. In the embodiment shown in FIG. 1, the one or more third-party systems may provide content objects to computer system 106. The one or more third-party systems may include an email server, a social networking site, a travel site, as well as internal inventory, human resources, docket, and communication systems of a corporation. Content objects may include email messages, meeting invitations, connection requests, travel itineraries, task notifications, inventory reports, workflow requests, personal leave requests, and corporate announcements.

Computer system 106 may be a client or server device (e.g., host server, cloud server, web server, application server, etc.). Computer system 106 may include one or more central processing units (CPUs), a main memory, one or more secondary storage devices, a network interface, and an operating system. Computer system 104 may also include various modules such as a profile store 106 (*a*), a nudge generator 106 (*b*), a nudge card generator 106 (*c*), a nudge card store 106 (*d*), a recommendation engine 106 (*c*), and a rules engine 106 (*f*). Such modules may be implemented as software, hardware, or a combination of software and hardware.

Profile store 106 (*a*) may store user profiles for registered users of computer system 106. Each user profile may include the biographic and demographic information supplied by the registered user, such as name, gender, age, location, educational background, work experience (e.g., job titles and employers), professional accomplishments, and skills. Each user profile may also include data indicating subject matter that may be of interest to the registered user. For example, a user profile may include plurality of channel (i.e., topic) subscriptions. A registered user may add or delete channel subscriptions from his user profile at any time. Computer system 106 may also add or delete channel subscriptions to a user profile automatically based on the registered user's biographic and demographic information. For example, computer system 106 may add a channel subscription based on the registered user's current employer. Alternatively, computer system 106 may add a channel subscription because other registered users with similar demographic or professional characteristics have subscribed to that channel. Furthermore, each channel subscription in a user profile may also be associated with a weighting value that reflects the level of interest in that channel. The weighting values may be expressed on a 0-to-100 point scale. When a channel subscription is added, the weighting value may be initially set to 50. As will be discussed in further detail below, the weighting value for each channel subscription in a user profile may also be adjusted in real-time as the registered user interacts with objects in a nudge card feed.

Nudge generator 106 (b) may receive a content object from a third-party system 104 and generate a nudge data structure based on the content object. Information in the nudge data structure can be organized using any number of known data formats. For example, in one embodiment, information in the nudge data structure can be organized as a JavaScript Object Notation (JSON) document. JSON is a lightweight, text-based data-interchange format that can be used to transmit structured data in web applications. In this embodiment, JSON document may include multiple sections, such as a first section configured to store elements from the content object, a second section configured to obtain and store supplemental data from a plurality of enrichment sources (e.g., an enrichment pipeline 108), a third section configured to store one or more topics identified in the content object, and a fourth section configured to store expiration data.

Upon receiving a content object from a third-party system 102, the nudge generator 106 (b) may parse the content object to identify content elements in the content object. The nudge generator 106 (b) may store the identified content elements in the first section of the JSON document. The second section of the JSON document may be configured to obtain and store supplemental data from a plurality of enrichment sources (e.g., enrichment pipeline 108). The second section of the JSON document may include a plurality of enrichers to collect supplemental data for each identified content element. The plurality of enrichers may be one or more micro services that are each configured to query a targeted enrichment source using one of the identified content items as search criteria. The plurality of enrichers may be arranged in a sequential order such that data retrieved by one enricher may be used as search criteria by the next enricher. Further, each enricher may be configured to retrieve data from an enrichment source once, repeatedly at defined intervals (e.g., daily), or whenever a change occurs in the enrichment source. Supplemental data retrieved by the plurality of enrichers may be stored in the second section of the JSON document. The nudge generator 106 (b) may also analyze the text in a content object using machine learning techniques, such as topic classification or topic modeling, to identify one or more topics discussed in the content object. Topics may refer to a particular subject matter, an industry, a company, or a person (e.g., the person who sent or received the content object). The nudge generator 106 (b) may store the identified one or more topics in the third section of the JSON document. The nudge generator 106 (b) may additionally assign an expiration timer to the fourth section of the JSON document. The expiration timer may be based on a date specified in the content object. For example, if a content object is a meeting request for a particular day, the nudge generator 106 (b) may set the expiration timer to a time remaining until that date. Alternatively, the nudge generator 106 (b) may set the expiration timer to a predefined period (e.g., 48 hours) after the date specified in the content object.

Template store 106 (c) may store a plurality of templates for nudge cards. The plurality of templates may be adaptive card templates. Adaptive cards are a flexible and interactive method of sharing and displaying information across multiple platforms. The plurality of templates may correspond to the types of content objects received from the third-party system 102. For example, the plurality of templates may include a template for task notifications (e.g., upcoming due dates or help desk tickets), a template for announcements (e.g., internal corporate news bulletin or work anniversaries for colleagues), and a template for requests (e.g., meeting invitations, connection requests, or workflow/approval requests). Each template may also be associated with a defined set of interface elements. For example, the template for task notifications may include a "View Details" button, an "Add a Comment" button, and a "Close Task" button. The template for announcements may include a "Like" button and an "Add a Comment." The template for incoming requests may include a "View Details" button, an "Approve" button, and a "Deny" button. The template store may also allow users to create and store custom templates for other types of content objects.

Nudge card generator 106 (d) may create a nudge card using the nudge data structure generated by the nudge generator 106 (b). The nudge card generator 106 (d) may select a template from the plurality of templates in the template store 106 (c) based on the type of content object received from third-party system 102. The nudge card generator 106 (d) may next create a nudge card by populating the selected template using the content elements in the first section of the nudge data structure, the supplemental data in the second section of the nudge data structure, the one or more topics in the third section of the nudge data structure, and an expiration timer in the fourth section of the nudge data structure.

Nudge card store 106 (e) may store nudge cards generated by nudge card generator 106 (d). Additionally, the nudge card store 106 (e) may store underlying content objects received from third-party system(s) 102 and nudge data structures generated by nudge generator 106 (b).

The recommendation engine 106 (f) may determine a set of recommended nudge cards for presentation to a user. Upon receiving a request for a nudge card feed from user device 102, the recommendation engine may obtain the user's channel subscriptions and associated weighting values from the user profile. The recommendation engine 106 (f) may search the nudge card store 106 (e) to identify nudge cards with expiration timers that have not elapsed and that have one or more assigned topics matching one or more of the channel subscriptions from the user profile. The recommendation engine 106 (f) may also determine a relevance score for each identified nudge card by computing the sum of the weighting values associated with the one or more channel subscriptions in the user profile matching the one or more topics assigned to nudge card. The recommendation engine 106 (f) may further generate a nudge card feed using the identified nudge cards with relevance scores that exceed predetermined threshold, which may be established by the user or computer system 106. The recommendation engine 106 (f) may further arrange the nudge cards in the nudge card feed according to their relevance scores prior to transmitting the nudge card feed to user device 102.

Alternatively, the recommendation engine 106 (f) may determine a relevance score for each identified nudge card by using a hybrid matrix factorization algorithm that combines content-based filtering and collaborative filtering. Content-based filtering is a method for recommending items to a user by associating the user with items having characteristics of features that match the user's interest(s). Collaborative filtering, on the other hand, relies on past user behavior (e.g., previous interactions with items) and produce item recommendations based on the preferences of similar users. The recommendation engine 106 (f) may use vector representations of the user and the identified nudge cards that are given by the sum of the associated feature latent factors. The latent factors are learned from feature metadata (e.g., the user's location, job, relationships, clients, and other information that may be inferred by computer system 106) and data regarding prior user interactions with nudge cards using a Bayesian likelihood objective function and stochastic gradient descent. Data regarding prior user interactions may be obtained by a user behavior tracking module 106 (h), which is described in further detail below. The recommendation engine 106 (f) may determine a prediction score for each nudge card by computing the dot product of the vector representations for the user and the identified nudge card (and bias terms). Afterwards, the recommendation engine 106 (f) may generate a nudge card feed using the identified nudge cards with prediction scores that exceed a predetermined threshold, which may be established by the user or computer system 106. The recommendation engine 106 (f) may arrange the nudge cards in the nudge card feed according to their prediction scores before transmitting the nudge card feed to user device 102.

Furthermore, the recommendation engine 106 (f) may also generate a nudge card feed for new users by constructing a vector representation for the new user from feature latent factors of existing users and computing the dot product of the vector representations for the new user and existing nudge cards. The recommendation engine 106 (f) may also identify nudge cards that are similar to a target nudge card by computing the cosine similarity between the target nudge card embedding and the embedding of all other nudge cards stored in the nudge card store 106 (e).

The rules engine 106 (g) may operate in tandem with the recommendation engine 106 (f) to generate a nudge card feed. The rules engine 106 (g) may apply rules for including or excluding certain nudge cards from a nudge card feed prior to transmitting the nudge card feed to the user. For example, rules engine 106 (g) may apply a rule to filter a nudge card from a nudge card feed based on an ethical wall organized by a company or firm to prevent certain employees from viewing sensitive information relating to a particular client or matter. Alternatively, rules engine 106 (g) may apply a rule to ensure that certain nudge cards (e.g., an announcement from a firm's chief executive operator) are always included in a nudge card feed.

User behavior tracking module 106 (h) may receive data indicating actions taken by a user regarding nudge cards in the nudge card feed. Actions may include actively interacting with a nudge card (e.g., clicking on an interface element in the nudge card), viewing the nudge card (e.g., dwelling on the nudge card for greater than two seconds), ignoring the nudge card (e.g., dwelling on the nudge card for less than two seconds), dismissing the nudge card (e.g., closing the "X" button in the top corner), clicking thumbs down, clicking thumbs down and selecting "Not interested," and clicking thumbs down and selecting "Not helpful to me right now." User behavior tracking module 106 (h) may assign a score to each action. For example, user behavior tracking module 106 (h) may give active engagement with a nudge card a +10 score. User behavior tracking module 106 (h) may assign a cursory review of a nudge card with a −5 score. User tracking behavior module 106 (h) may issue a −10 score to the ignoring a nudge card, dismissing the nudge card, clicking thumbs down, and clicking thumbs down and selecting "Not helpful to me right now" actions. User behavior tracking module 106 (h) may further assign a −30 score to the clicking thumbs down and selecting "Not interested" action. User behavior tracking module 106 (h) may further update a weighting value for one or more channel subscriptions in a user profile based on the score issued to an action taken by a user on the nudge card. For example, the behavior tracking module 106 (h) may add the score to the weighting value for each channel subscription in the user profile that matches one or more assigned topics in the nudge card.

Enrichment pipeline 108 may comprise a series of third-party data sources that a plurality of enrichers may query in order to collect supplemental data for each content element identified in the content object. The enrichment pipeline 108 may comprise multiple data sources including, but not limited to, a customer relationship management (CRM) system, a relationship intelligence database, social networking site(s), a company docket system, an email server, news source(s), a company logo database, weather source(s), and geolocation data source(s).

Network 110 may include one or more wired or wireless networks. For example, the network 108 may include a cellular network (e.g., a long-term evolution network (LTE) network, a code division multiple access (CDMA) network, a 3G network, a 4G network, a 5G network, another type of next generation network, etc.) The network 108 may also include a public land mobile network (PLMN), a local area network (LAN), a wide area network (WAN), a metropolitan area network (MAN), a telephone network (e.g., the Public Switched Telephone Network (PTSN)), a private network, an ad hoc network, an intranet, the Internet, a fiber optic-based network, a cloud computing network, and/or the like, and/or a combination of these or other types of networks.

Figure 2:
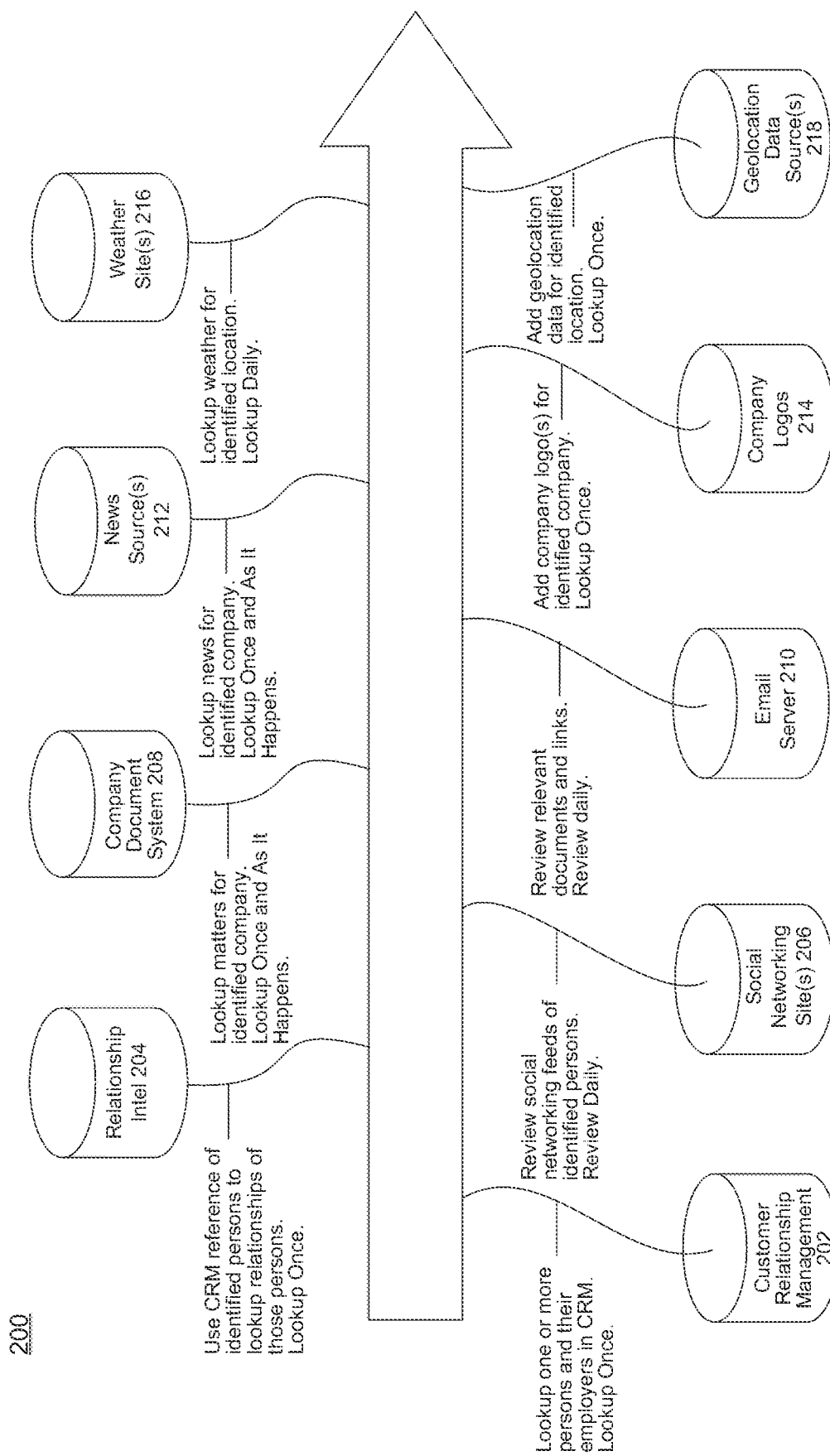
FIG. 2 is a block diagram of an exemplary enrichment pipeline, in accordance with aspects of the disclosure.

FIG. 2 illustrates a block diagram of an exemplary enrichment pipeline, in accordance with aspects of the disclosure. In the embodiment shown in FIG. 2, the enrichment pipeline may comprise a CRM system 202, a relationship intelligence database 204, social networking site(s) 206, a company docket system 208, an email server 210, news source(s) 212, a company logo database 214, weather source(s) 216, and geolocation data source(s) 218.

A CRM system 202 may be a tool that enables businesses to track customer data and manage relationships with customers. A CRM system 202 may aggregate personal details regarding existing and potential customers, such as names, job titles, and employers. The CRM system 202 may additionally collect historical data about interactions between a business entity and the customer, such as engagement with marketing campaigns, phone calls to customer support, prior purchases, and demonstrated interest in particular products or services. As shown in FIG. 2, a first enricher in the JSON document may search for one or more persons identified in a content object and their employers in the CRM system 202. The first enricher may obtain link(s) to matching record(s) identified in the CRM system 202. The first enricher may search the CRM system 202 once.

A relationship intelligence database 204 may contain data regarding known relationships of the one or more persons identified in the content object. As shown in FIG. 2, a second enricher in the JSON document may use the CRM reference(s) obtained by the first enricher to obtain relationship data for the one or more persons identified in the content object. The second enricher may obtain a list of people that may be socially or professionally connected to the one or more persons identified in the content object. The second enricher may search the relationship intelligence database 204 once.

Social networking sites 206 may be websites or applications that allow users and organizations to interact with other users, form relationships, and share information. Examples of social networking sites may include LinkedIn™, Facebook™, and Twitter™. As shown in FIG. 2, a third enricher in the JSON document may obtain data indicating the social networking activity of the one or more persons identified in the content object. Such data may include what the one or more persons identified in the content object may have posted or shared recently (e.g., previous 24 hours or previous seven days). The third enricher may query social networking site(s) and retrieve data from the social networking site(s) 206 daily.

A fourth enricher in the JSON document may query a company docket system 208 for matters belonging to employer(s) of the one or more persons identified in the content object. The fourth enricher may obtain a list of matters belonging to the employer(s) of the one or more persons identified in the content object. The fourth enricher may be configured to retrieve additional matters belonging to the employer(s) of the one or more persons identified in the content object as new matters are added to the company docket system 208.

A fifth enricher in the JSON document may search an email server 210 for documents and links recently shared by the one or more persons identified in the content object. The fifth enricher may be configured to obtain a list of documents and links shared by the one or more persons identified in the content object daily. The fifth enricher may also be configured to retrieve additional documents and links in real-time after being shared by the one or more persons identified in the content object.

A sixth enricher in the JSON document may search news source(s) 212 for articles about the employer(s) of the one or more persons identified in the content object. The sixth enricher may obtain links to articles from the news source(s) 212 once and update the links in real-time as new articles are added to news source(s) 212.

A seventh enricher in the JSON document may search a company logo database 214 for logo(s) belonging to the employer(s) of the one or more persons identified in the content object. The seventh enricher may obtain at least one logo for the employer(s).

An eighth enricher in the JSON document may search weather source(s) 216 for weather data for a location identified in the content object. The eighth enricher may be configured to obtain and/or update weather data for a location daily.

A ninth enricher in the JSON document may search one or more geolocation data source(s) 218 for geolocation data (e.g., maps, driving directions, and links to ride-sharing services) for a location identified in the content object. The ninth enricher may be configured to search for and obtain geolocation data for a location once.

Figure 3:
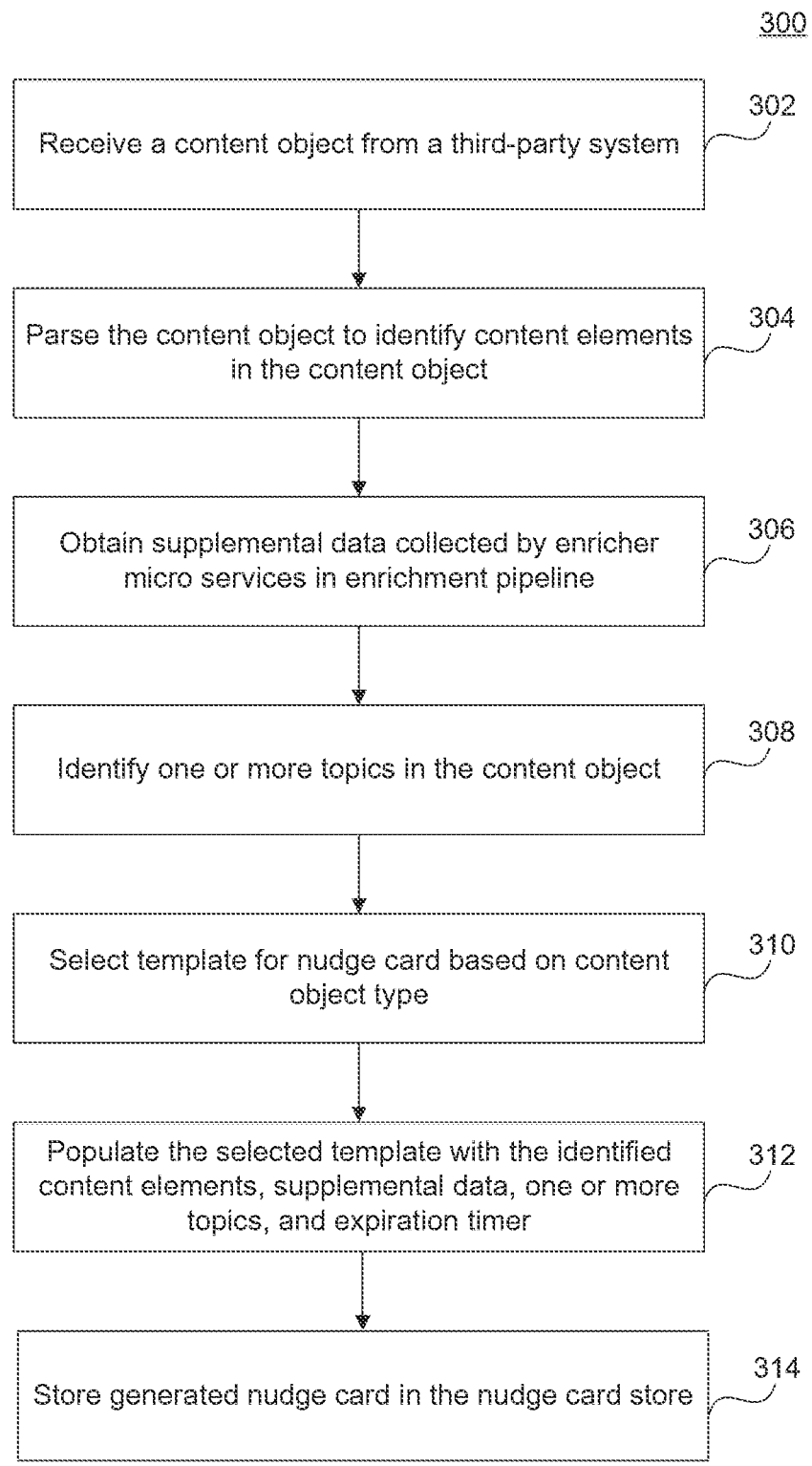
FIG. 3 illustrates a flow chart of an example method for creating a nudge card for a content object, in accordance with aspects of the disclosure.
Figure 4:
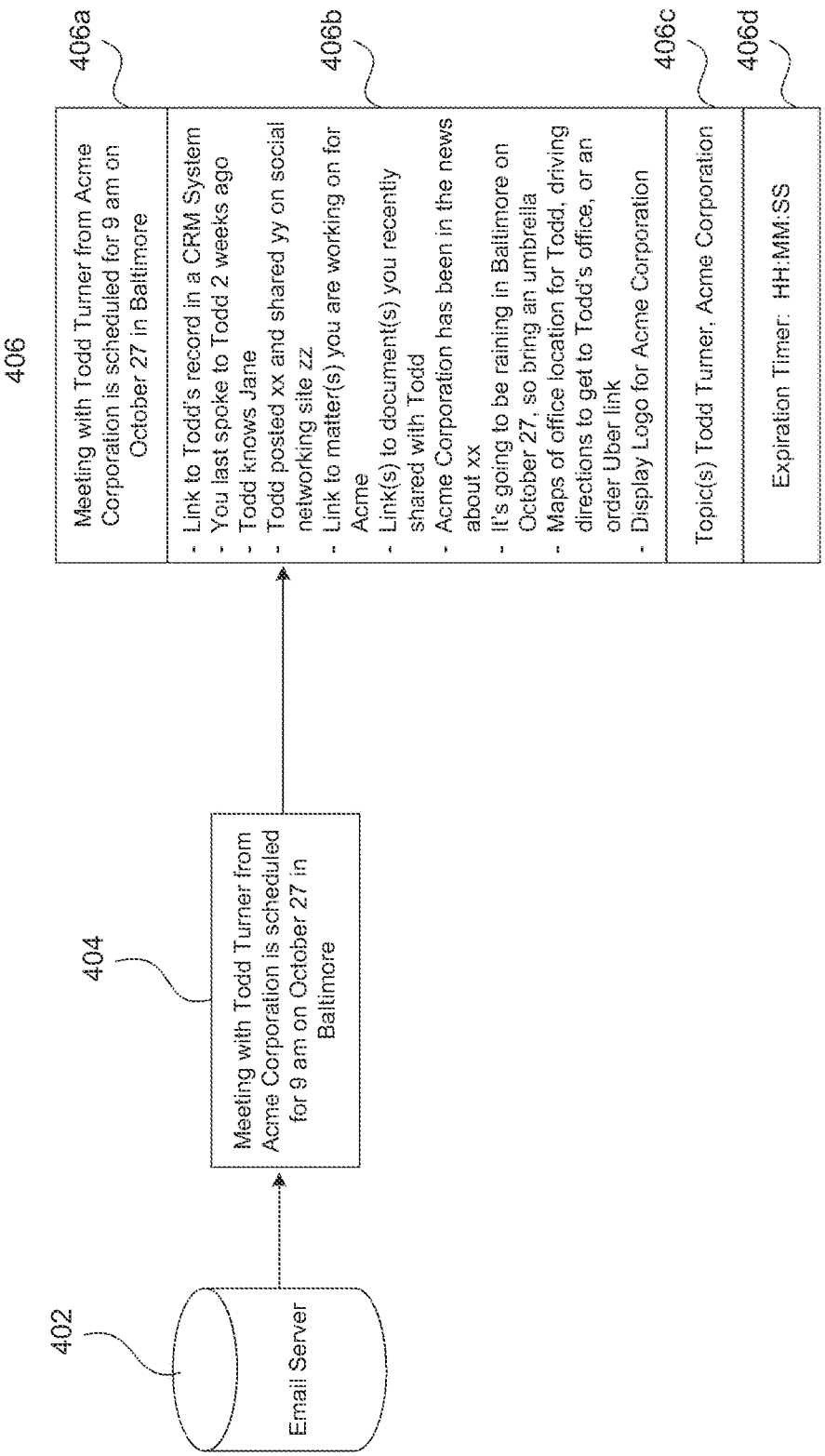
FIG. 4 illustrates an exemplary nudge card for a content object, in accordance with aspects of the disclosure.
Figure 5:
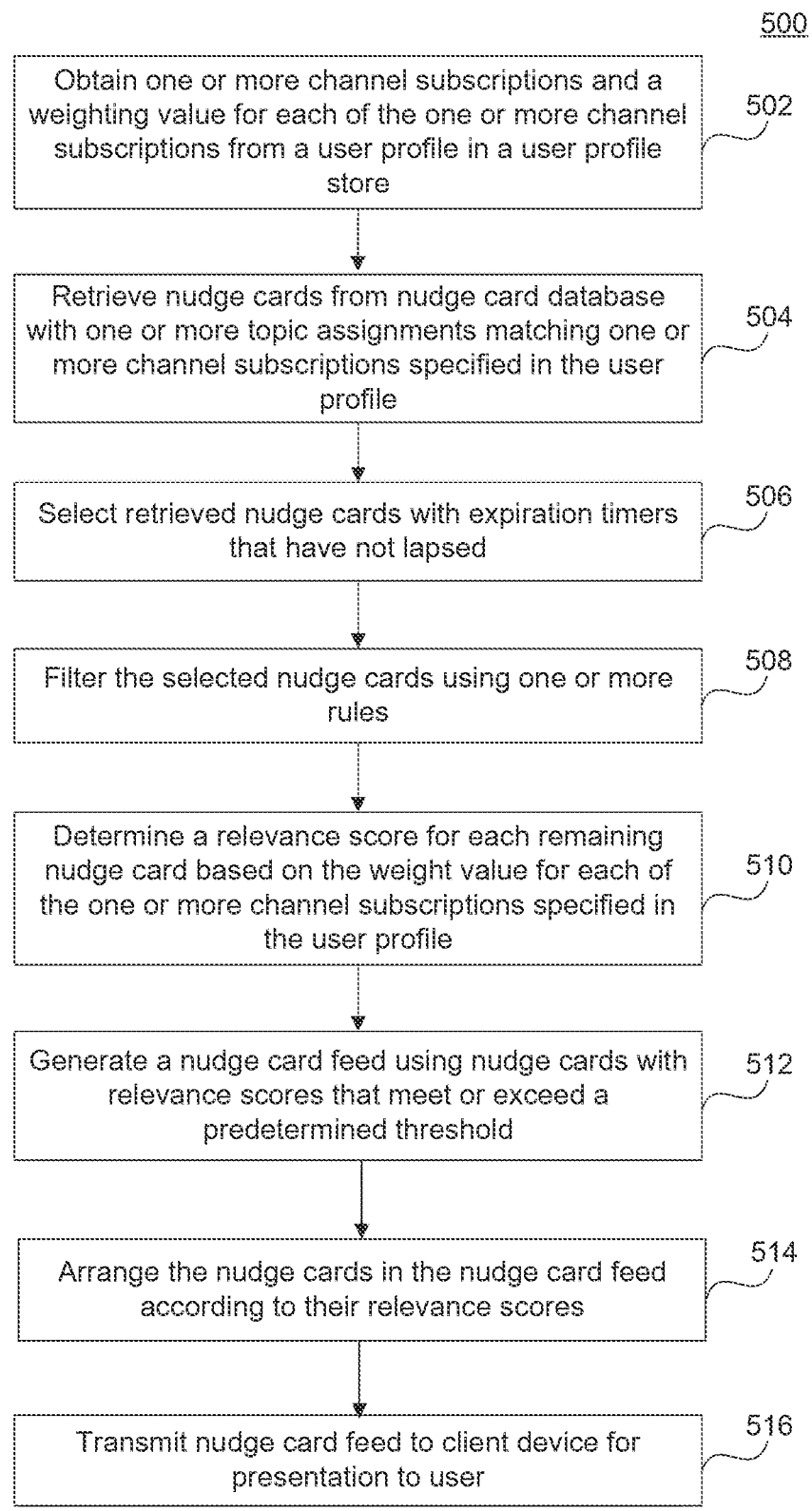
FIG. 5 illustrates a flow chart of an example method for generating nudge card feed, in accordance with aspects of the disclosure.

FIGS. 3-5 further display key aspects of a method for generating intelligent prompts. An example scenario is provided to better illustrate the inventive concept disclosed herein. In this scenario, a user receives a meeting invitation in his Microsoft Outlook™ email account from Todd Turner at Acme Corporation (todd.turner@acme.com) requesting to meet at 9 am on October 27th in Baltimore.

FIG. 3 illustrates a flow chart of an example method 300 for creating a nudge card for a content object, in accordance with aspects of the disclosure. Method 300 shall be described with reference to FIGS. 1 and 2. However, method 300 is not limited to that embodiment.

Operation 302 of method 300 may include the computer system 106 receiving a content object from a third-party system 102. For example, in the above scenario, the nudge generator 106 (b) of computer system 106 may receive a meeting invitation from a Microsoft Outlook Exchange™ server.

Operation 304 of method 300 may include the computer system 106 parsing the content object to identify content elements in the content object. For example, in the above scenario, the nudge generator 106 (b) of computer system 106 may parse a meeting invitation to identify content elements in the meeting invitation such as the email address of the person who sent the invitation (todd.turner@acme.com), the date of the meeting (October 27), and the location of the meeting (Baltimore). The nudge generator 106 (b) may identify the name of a company or employer (Acme Corporation) based on the domain name in the email address of the person who sent the invitation (acme.com). The nudge generator 106 (b) may store the above identified content elements in a first section of a JSON document.

Operation 306 of method 300 may include the nudge generator 106 (b) receiving supplemental data collected by a plurality of enrichers embedded in the second section of the JSON document, such as those in FIG. 2. For example, a first enricher may use Todd Turner's email address to search for a matching record for Todd Turner in a CRM system 202. A second enricher may use the CRM record for Todd Turner to search a relationship intelligence database 204 in order to obtain data regarding Todd's relationships. A third enricher may also use the CRM record for Todd Turner to access or review Todd's social networking feeds from social networking site(s) 206. A fourth enricher may use the name of the identified company or employer to query a company docket system 208 utilized by the user's firm to identify matters that the user's firm is handling on behalf of Acme Corporation. A fifth enricher may also use Todd Turner's email address to search an email server 210 to obtain documents and links that Todd Turner may have recently shared with the user. A sixth enricher may use the name of the identified company or employer to search news source(s) 212 to obtain links to articles about Acme Corporation. A seventh enricher may also use the name of the identified company or employer to search a company logo database 214 to obtain a logo for the Acme Corporation. An eighth enricher may use the identified location of the meeting to search a weather Site(s) 216 to obtain weather data for Baltimore. Finally, a ninth enricher may also use the identified location of the meeting to search a geolocation data source(s) 218 to obtain driving directions for the meeting in Baltimore. The second section of the JSON document may further store the supplemental data collected by the above plurality of enrichers.

Operation 308 of method 300 may include the nudge generator 106 (b) identifying one or more topics in the content object received from a third-party system 102. As mentioned earlier, a topic may be a particular subject matter, an industry, a company, or a person (e.g., the person who received the content object). The nudge generator 106 (b) may analyze the text in a content object using machine learning techniques, such as topic modeling or topic classification, to identify one or more topics discussed in the content object. The nudge generator 106 (b) may store the identified one or more topics in a third section of the JSON document. For example, in the above example, the nudge generator 106 (b) may identify Todd Turner and Acme Corporation as topics for the meeting request. Furthermore, operation 308 may also include assigning an expiration timer to a fourth section of the JSON document based on a date specified in the content object. For example, in the above scenario, the nudge generator may set the expiration timer to a time remaining until the meeting on October 27.

Operation 310 of method 300 may include the nudge card generator 106 (*d*) selecting a template for a nudge card based on a content object type for the received content object. The nudge card generator 106 (*d*) may select a template from a plurality of templates in template store 106 (*c*). For example, in the above scenario, the nudge card generator 106 (*d*) may identify meeting request as a request and select a template for requests from template store 106 (*c*).

Operation 312 of method 300 may include the nudge card generator 106 (*d*) creating a nudge card by populating the selected template from template store 106 (*c*) with the content elements in the first section of the JSON document, the supplemental data in the second section of the JSON document, the one or more topics in the third section of the JSON document, and an expiration timer in the fourth section of the JSON document.

Operation 314 of method 300 may include the nudge card generator 106 (*d*) storing the generated nudge card in the nudge card database 106 (*e*).

FIG. 4 illustrates a block diagram of exemplary nudge data structure for a content object, in accordance with aspects of the disclosure. In the above example scenario, an email server 402 provides a meeting request 404 to computer system 106. Nudge generator 106 (*b*) of computer system 106 may generate a nudge data structure using the meeting request 404. As explained previously, the nudge data structure may be generated using JSON documents. Element 406 of FIG. 4 illustrates an exemplary structure of a JSON document. Element 406*a* depicts the first section of a JSON document that stores content elements identified from the content object. Element 406*b* depicts a second section of the JSON document that stores supplemental data that is collected by a plurality of enrichers embedded in the JSON document. For example, in the above scenario, element 406*b* may include, but are not limited to, a link to Todd's record in a CRM system, a link to matters the user is working on for Acme Corporation, a weather prediction for Baltimore on October 27, a map of the office location for Todd Turner and driving directions to Todd Turner's office or a link to order an Uber. Element 406*c* depicts a third section of the JSON document that stores one or more identified topics. For example, in the above scenario, element 406*c* may specify that Todd Turner and Acme Corporation are topics in the received content object. Furthermore, element 406*d* depicts a fourth section of the JSON document that stores an expiration timer. For example, in the above scenario, the meeting request may be received from a third-party system 102 four days prior to the actual meeting. In this case, the nudge generator 106 (*b*) may assign an expiration timer of 96:00:00 to the fourth section of the JSON document.

FIG. 5 illustrates a flow chart of an example method 500 for generating nudge card feed, in accordance with aspects of the disclosure. Method 500 shall be described with reference to FIG. 1. However, method 500 is not limited to that embodiment.

Operation 502 of method 500 may include the computer system 106 retrieving one or more channel subscriptions and a weighting value or each of the one or more channel subscriptions from a user profile in a profile store 106*a*.

Operation 504 of method 500 may include the recommendation engine 106 (*f*) of computer system 106 retrieving nudge cards from a nudge card store 106 (*c*) with one or more assigned topics matching the one or more channel subscriptions specified in the user profile.

Operation 506 of method 500 may include the recommendation engine 106 (*f*) of computer system 106 selecting nudge cards with expiration timers that have not elapsed from the set of retrieved nudge cards.

Operation 508 of method 500 may include the rules engine 106 (*g*) of computer system 106 filtering the selected nudge cards using one or more rules.

Operation 510 of method 500 may include the recommendation engine 106 (*f*) of computer system 106 determining a relevance score for each remaining nudge card. The recommendation engine 106 (*f*) may determine a relevance score for each of the remaining identified nudge cards by computing the sum of the weighting values associated with the one or more channel subscriptions in the user profile matching the one or more topics assigned to nudge card.

Operation 512 of method 500 may include the recommendation engine 106 (*f*) of computer system 106 generating a nudge card feed using the identified nudge cards with a relevance score above a predetermined threshold, which may be established by the user or computer system 106.

Operation 514 of method 500 may include the recommendation engine 106 (*f*) of computer system 106 arranging the nudge cards in the nudge card feed according to their relevance scores.

Operation 516 of method 500 may include the recommendation engine 106 (*f*) of computer system 106 transmitting the nudge card to a user device for presentation to the user.

Figure 6:
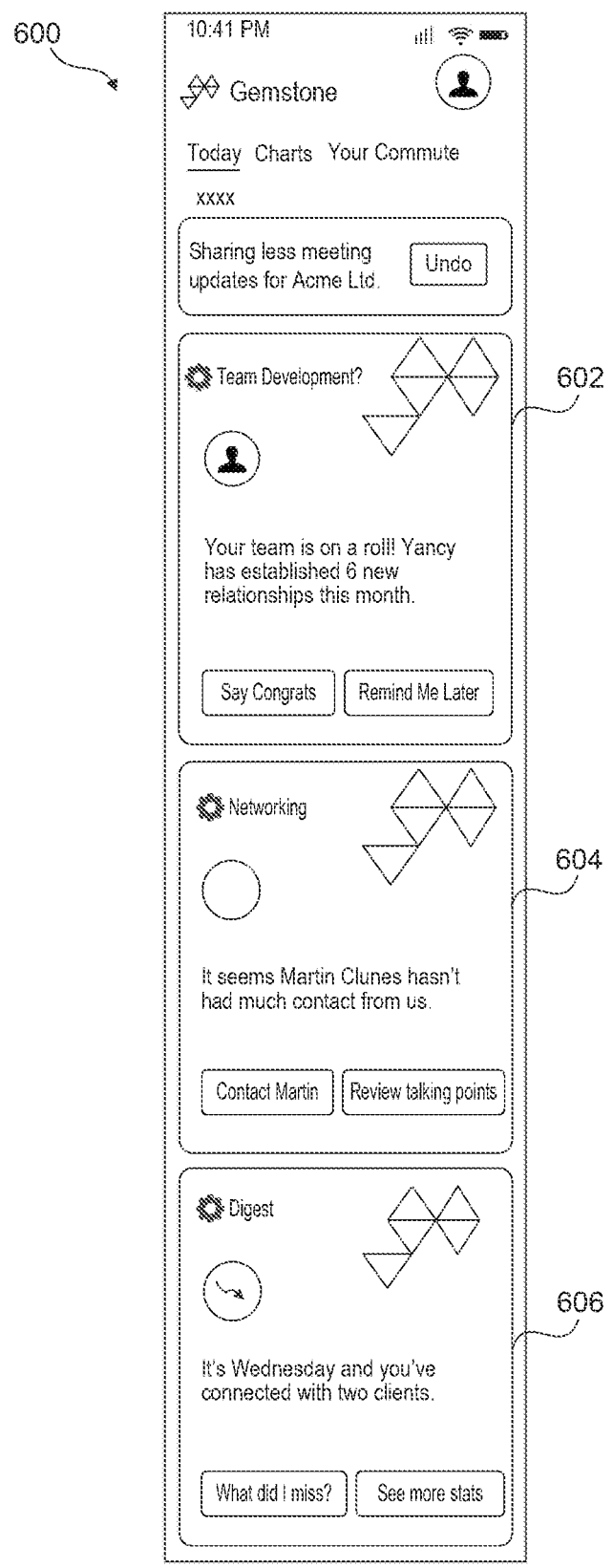
FIG. 6 illustrates an exemplary nudge card feed displayed in an output interface, in accordance with aspects of the disclosure.

FIG. 6 illustrates an exemplary nudge card feed displayed in an output interface, in accordance with aspects of the disclosure. As shown in FIG. 6, the nudge card feed 600 displayed on an output interface of a user device may include a plurality of nudge cards, wherein each card nudge card in the nudge card feed may include one or more interface elements, such as nudge card 602, 604, and 606.

Although FIGS. 3 and 5 depict steps that are performed in a particular order for purposes of illustration and discussion, the methods of the present disclosure are not limited to the particularly illustrated order or arrangement. The various steps of methods 300 and 500 can be omitted, rearranged, combined, or adapted in various ways without deviating from the scope of the present disclosure. Furthermore, methods 300 and 500 can be performed by processing logic that can comprise hardware (e.g., circuitry, dedicated logic, programmable logic, microcode, etc.), software (e.g., instructions executing on a processing device), or a combination thereof.

Figure 7:
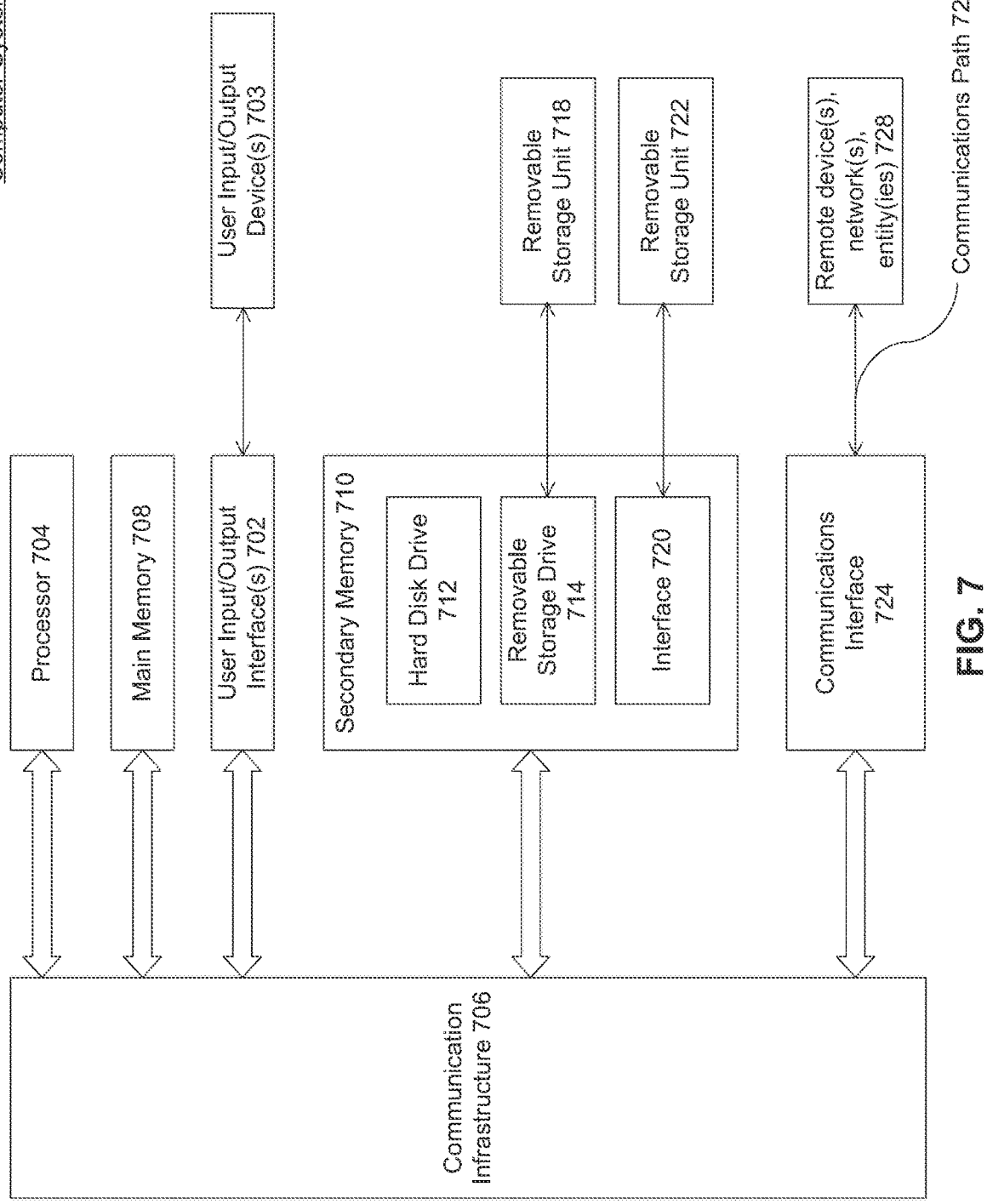
FIG. 7 is an example computer system useful for implementing various embodiments.

FIG. 7 illustrates an example computer system useful for implementing various embodiments in FIGS. 1-6.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for generating intelligent prompts, comprising:
    identifying, by at least one processing device, a plurality of content elements in a content object retrieved from a third-party system;
    receiving supplemental data collected by one or more enricher micro services invoked based on the plurality of content elements in the content object;
    identifying one or more topics in the content object;
    creating a nudge card for the content object comprising the plurality of content elements, the supplemental data, the one or more topics, an expiration timer, and at least one interface element associated with an action, wherein creating the nudge card for the content object comprises:
    selecting a template for the nudge card corresponding to a content object type of the content object; and
    populating the selected template with the plurality of content elements, the supplemental data, the one or more topics, and the expiration timer; and
    transmitting the nudge card for the content object within a nudge card feed to a client device for presentation to a user.

2. The computer-implemented method of claim 1, further comprising:
    obtaining a profile for the user from a profile database, wherein the profile comprises one or more channel subscriptions and a weighting value for each of the one or more channel subscriptions;
    retrieving nudge cards with one or more topics matching the one or more channel subscriptions in the profile;
    selecting the retrieved nudge cards with expiration timers that have not yet elapsed;
    determining a relevance score for each selected nudge card based on the one or more topics for the nudge card and the weighting value for each of the one or more channel subscriptions; and
    generating the nudge card feed using nudge cards that have a relevance score above a predetermined threshold.

3. The computer-implemented method of claim 2, further comprising:
    filtering the nudge card feed using one or more rules; and
    arranging the nudge cards in the nudge card feed based on the relevance scores.

4. The computer-implemented method of claim 2, further comprising:
    receiving an indication of user interaction with the at least one interface element in the nudge card; and
    updating the weighting value associated with each of the one or more channel subscriptions in the profile based on the received indication.

5. The computer-implemented method of claim 1, wherein the supplemental data collected by the one or more enricher micro services comprises at least one of: customer relationship management records, relationship data, social networking feeds, company logos, geolocation data, and weather data.

6. The computer-implemented method of claim 1, wherein the content object type comprises an announcement, a task notification, or a request.

7. A system for generating intelligent prompts, comprising:
    one or more processors; and
    a memory communicatively coupled to the one or more processors, wherein the memory stores instructions that, when executed by the one or more processors, cause the one or more processors to perform operations comprising:
    identifying a plurality of content elements in a content object retrieved from a third-party system;
    receiving supplemental data collected by one or more enricher micro services invoked based on the plurality of content elements in the content object;
    identifying one or more topics in the content object;
    creating a nudge card for the content object comprising the plurality of content elements, the supplemental data, the one or more topics, an expiration timer, and at least one interface element associated with an action, wherein creating the nudge card for the content object comprises:
    selecting a template for the nudge card corresponding to a content object type of the content object; and
    populating the selected template with the plurality of content elements, the supplemental data, the one or more topics, and the expiration timer; and
    transmitting the nudge card for the content object within a nudge card feed to a client device for presentation to a user.

8. The system of claim 7, wherein the operations further comprise:
    obtaining a profile for the user from a profile database, wherein the profile comprises one or more channel subscriptions and a weighting value for each of the one or more channel subscriptions;
    retrieving nudge cards with one or more topics matching the one or more channel subscriptions in the profile;
    selecting the retrieved nudge cards with expiration timers that have not yet elapsed;
    determining a relevance score for each selected nudge card based on the one or more topics for the nudge card and the weighting value for each of the one or more channel subscriptions; and
    generating the nudge card feed using nudge cards that have a relevance score above a predetermined threshold.

9. The system of claim 8, wherein the operations further comprise:
  filtering the nudge card feed using one or more rules; and
  arranging the nudge cards in the nudge card feed based on the relevance scores.

10. The system of claim 7, wherein the operations further comprise:
  receiving an indication of user interaction with the at least one interface element in the nudge card; and
  updating the weighting value for each of one or more channel subscriptions in a profile based on the received indication.

11. The system of claim 7, wherein the supplemental data collected by the one or more enricher micro services comprises at least one of: customer relationship management records, relationship data, social networking feeds, company logos, geolocation data, and weather data.

12. The system of claim 7, wherein the content object type comprises an announcement, a task notification, or a request.

13. A non-transitory computer readable medium storing instructions that, when executed by one or more processors, cause the one or more processors to perform operations comprising:
  identifying a plurality of content elements in a content object retrieved from a third-party system;
  receiving supplemental data collected by one or more enricher micro services invoked based on the plurality of content elements in the content object;
  identifying one or more topics in the content object;
  creating a nudge card for the content object comprising the plurality of content elements, the supplemental data, the one or more topics, an expiration timer, and at least one interface element associated with an action, wherein creating the nudge card for the content object comprises:
    selecting a template for the nudge card corresponding to a content object type of the content object; and
    populating the selected template with the plurality of content elements, the supplemental data, the one or more topics, and the expiration timer; and
  transmitting the nudge card for the content object within a nudge card feed to a client device for presentation to a user.

14. The non-transitory computer readable medium of claim 13, wherein the operations further comprise:
  obtaining a profile for the user from a profile database, wherein the profile comprises one or more channel subscriptions and a weighting value for each of the one or more channel subscriptions;
  retrieving nudge cards with one or more topics matching the one or more channel subscriptions in the profile;
  selecting the retrieved nudge cards with expiration timers that have not yet elapsed;
  determining a relevance score for each selected nudge card based on the one or more topics for the nudge card and the weighting value for each of the one or more channel subscriptions; and
  generating the nudge card feed using nudge cards that have a relevance score above a predetermined threshold.

15. The non-transitory computer readable medium of claim 14, wherein the operations further comprise:
  filtering the nudge card feed using one or more rules; and
  arranging the nudge cards in the nudge card feed based on the relevance scores.

16. The non-transitory computer readable medium of claim 13, wherein the operations further comprise:
  receiving an indication of user interaction with the at least one interface element in the nudge card; and
  updating the weighting value for each of one or more channel subscriptions in a profile based on the received indication.

17. The non-transitory computer readable medium of claim 13, wherein the supplemental data collected by the one or more enricher micro services comprises at least one of: customer relationship management records, relationship data, social networking feeds, company logos, geolocation data, and weather data.

* * * * *